United States Patent
Zheng et al.

(10) Patent No.: US 10,442,630 B2
(45) Date of Patent: Oct. 15, 2019

(54) SUPPORTING AND TRANSFERRING MECHANISM AND SUPPORTING AND TRANSFERRING DEVICE

(71) Applicants: BOE Technology Group Co., Ltd., Beijing (CN); BEIJING BOE DISPLAY TECHNOLOGY CO., LTD., Beijing (CN)

(72) Inventors: Yunliang Zheng, Beijing (CN); Renji Liu, Beijing (CN); Meng Wu, Beijing (CN); Di Ma, Beijing (CN); Kai Yu, Beijing (CN); Yongqi Deng, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/765,386

(22) PCT Filed: Sep. 22, 2017

(86) PCT No.: PCT/CN2017/102995
§ 371 (c)(1),
(2) Date: Apr. 2, 2018

(87) PCT Pub. No.: WO2018/171146
PCT Pub. Date: Sep. 27, 2018

(65) Prior Publication Data
US 2019/0071263 A1 Mar. 7, 2019

(30) Foreign Application Priority Data
Mar. 24, 2017 (CN) .................... 2017 2 0296263 U

(51) Int. Cl.
*B65G 39/02* (2006.01)
*B65G 39/08* (2006.01)
(Continued)

(52) U.S. Cl.
CPC .......... *B65G 39/025* (2013.01); *B65G 39/08* (2013.01); *B65G 49/061* (2013.01);
(Continued)

(58) Field of Classification Search
CPC .... B65G 13/02; B65G 39/025; B65G 39/067; B65G 39/07; B65G 39/08; B65G 49/064;
(Continued)

(56) References Cited

U.S. PATENT DOCUMENTS 3,874,749 A * 4/1975 Maniak ................ B65G 39/025
193/35 MD
4,553,795 A * 11/1985 Takagi .................. B30B 15/028
100/295
(Continued)

FOREIGN PATENT DOCUMENTS

| CN | 1987578 A | 6/2007 |
|---|---|---|
| CN | 102491090 A | 6/2012 |
| JP | H11-59864 A | 3/1999 |

OTHER PUBLICATIONS

International Search Report and Written Opinion, including English translation of Box V of the Written Opinion, for International Application No. PCT/CN2017/102995, dated Dec. 21, 2017, 13 pages.

*Primary Examiner* — Gene O Crawford
*Assistant Examiner* — Keith R Campbell
(74) *Attorney, Agent, or Firm* — Westman, Champlin & Koehler, P.A.

(57) ABSTRACT

A supporting and transferring mechanism and a supporting and transferring device are provided. The supporting and
(Continued)

transferring mechanism includes a gas supply portion, a supporting ball and an accommodating portion. An accommodating space is formed in the accommodating portion and the supporting ball is provided in the accommodating space. The gas supply portion is communicated with the accommodating portion to supply a gas of preset pressure into the accommodating space, so as to lift the supporting ball in the accommodating space such that a part of a surface of the supporting ball protrudes out of the accommodating portion. The part of the surface of the supporting ball protruding out of the accommodating portion supports and transfers the plate-like article.

15 Claims, 5 Drawing Sheets

(51) Int. Cl.
B65G 49/06 (2006.01)
C03B 35/16 (2006.01)
(52) U.S. Cl.
CPC ............ *B65G 49/064* (2013.01); *C03B 35/16* (2013.01); *B65G 2201/022* (2013.01)

(58) Field of Classification Search
CPC ............ B65G 49/065; B65G 2201/022; B65G 2207/06; B65G 2207/34; B65G 49/061; F16C 29/046; F16C 32/0402; F16C 39/04; F16C 39/066; C03B 35/16
See application file for complete search history.

(56) References Cited

U.S. PATENT DOCUMENTS

| 4,732,490 | A  | * | 3/1988 | Masciarelli | ......... | B65G 39/025 |
|           |    |   |        |             |           | 16/26 |
| 6,786,318 | B1 | * | 9/2004 | Pace        | ........  | B23Q 1/38 |
|           |    |   |        |             |           | 193/35 MD |
| 7,370,746 | B2 | * | 5/2008 | Iguchi      | .......   | B65G 39/025 |
|           |    |   |        |             |           | 193/35 MD |
| 7,650,979 | B2 | * | 1/2010 | Szarkowski  | ........  | B65G 13/065 |
|           |    |   |        |             |           | 193/35 MD |
| 8,011,307 | B2 | * | 9/2011 | Marcelli    | ........  | B65G 39/025 |
|           |    |   |        |             |           | 108/55.3 |
| 2010/0065400 | A1 | * | 3/2010 | Pruett  | .......  | B65G 39/025 |
|           |    |   |        |             |           | 193/35 MD |

* cited by examiner (the prior art)

SUPPORTING AND TRANSFERRING MECHANISM AND SUPPORTING AND TRANSFERRING DEVICE

CROSS-REFERENCE TO RELATED APPLICATION

This application is a Section 371 National Stage Application of International Application No. PCT/CN2017/102995, filed on Sep. 22, 2017, entitled "Supporting and Transferring Mechanism and Supporting and Transferring Device", which has not yet published, which claims priority to Chinese Application No. 201720296263.0, filed on Mar. 24, 2017, incorporated herein by reference in their entirety.

FIELD OF THE DISCLOSURE

Embodiments of the present disclosure relate to the field of manufacturing a display device, and in particular, to a supporting and transferring mechanism and a supporting and transferring device.

DESCRIPTION OF THE RELATED ART

A guide roller is widely used in the manufacturing industry of TFT-LCD (Thin Film Transistor Liquid Crystal Display). As shown in FIG. 1, in the process of manufacturing the TFT-LCD, a guide roller 8 is generally used as a transmission component and installed between two transmission wheels that drive a glass substrate to move. The guide roller 8 includes a bearing-type wheel. When the glass substrate is deformed due to its large size and thin thickness during transferring, the guide roller 8 supports the glass substrate, and the rotation of the guide roller 8 also assists the transmission wheels to transfer the glass substrate. The guide roller 8 can adjust the spacing between the glass substrate and gas outlets of upper and lower gas blowing components, in particular during that the glass substrate is passed through the gas blowing components, so as to ensure uniform drying of the glass substrate by the gas blowing components.

The existing guide roller 8 and the glass substrate are in line contact with each other, which will cause the wear and the change of position of the guide roller 8 over a long time of use, so that the guide roller cannot uniformly support the glass substrate and/or rotate with the movement of the glass substrate. At the same time, the wear and the change of position of the guide roller 8 may also lead to the deviation of the spacing between the glass substrate supported by the guide roller 8 and both the upper and lower gas blowing components, resulting in poor drying of the glass substrate.

SUMMARY

Embodiments of the present disclosure provide a supporting and transferring mechanism and a supporting and transferring device.

According to an embodiment of one aspect of the present disclosure, there is a supporting and transferring mechanism for a plate-like article, including: a gas supply portion; an accommodating portion in which an accommodating space is formed; and a supporting ball in the accommodating space; wherein the gas supply portion is communicated with the accommodating portion and configured to supply a gas of preset pressure into the accommodating space, so as to lift the supporting ball in the accommodating space such that a part of a surface of the supporting ball protrudes out of the accommodating portion, and wherein the part of the surface of the supporting ball protruding out of the accommodating portion supports the plate-like article so as to transfer the plate-like article.

According to an exemplary embodiment of the present disclosure, the accommodating portion includes a first member and a second member that are opposite to each other, and the first member and the second member are assembled together to form the accommodating space.

According to an exemplary embodiment of the present disclosure, the gas supply portion includes a gas supply passage configured to supply the gas of preset pressure into the accommodating space, and wherein the accommodating space includes a first opening which is communicated with an outlet of the gas supply passage, and the gas supplied by the gas supply passage enters the accommodating space through the first opening.

According to an exemplary embodiment of the present disclosure, the accommodating space further includes a second opening opposite to the first opening, and the part of the surface of the supporting ball protrudes out of the accommodating portion through the second opening.

According to an exemplary embodiment of the present disclosure, portions of both the first member and the second member that are located at the second opening are fitted with the surface of the supporting ball lifted by the gas.

According to an exemplary embodiment of the present disclosure, the supporting and transferring mechanism further includes a sealing sleeve including a third opening that is the same as the second opening in size and shape, and wherein the sealing sleeve is configured to sleeve the accommodating portion and the gas supply portion therein and to align the third opening with the second opening, so as to prevent the gas from leaking out of the accommodating space.

According to an exemplary embodiment of the present disclosure, the supporting and transferring mechanism further includes a magnetic member at the outlet of the gas supply passage; and wherein the supporting ball includes a magnet ball which has the same polarity as the magnetic member so as to generate a repulsive force between the magnet ball and the magnetic member.

According to an exemplary embodiment of the present disclosure, the magnetic member is matched with the outlet of the gas supply passage in size and shape, and the magnetic member is provided with a plurality of through holes therein in a direction of gas entering through the first opening, the plurality of through holes being uniformly distributed in the magnetic member.

According to an exemplary embodiment of the present disclosure, the supporting ball further includes a ball shell encapsulating the magnet ball, hardness of the ball shell being lower than hardness of the magnet ball; and wherein the magnet ball is configured such that magnetic lines from the magnet ball pass through the ball shell.

According to an exemplary embodiment of the present disclosure, the ball shell is made of plastic or glass.

According to an exemplary embodiment of the present disclosure, the supporting ball is made of glass or plastic.

According to an exemplary embodiment of the present disclosure, the first member and the second member are connected to the gas supply portion through a detachable connector.

According to an embodiment of another aspect of the present disclosure, there is further provided a supporting and transferring device for driving a plate-like article, including: at least one driving wheel configured to drive the plate-like article to move; and at least one supporting and transferring mechanism described above, configured to cooperate with the driving wheel so as to support and transfer the plate-like article.

DETAILED DESCRIPTION OF EMBODIMENTS

To enable those skilled in the art to better understand technical solutions of the disclosed embodiments, the supporting and transferring mechanism and the supporting and transferring device provided in the disclosed embodiments are further described in detail below with reference to the accompanying drawings and specific embodiments.

In addition, in the following detailed description, for ease of explanation, numerous specific details are set forth in order to provide a thorough understanding to embodiments of the present disclosure. However, it is apparent that one or more embodiments may be practiced without these specific details. In other instances, well-known structures and devices are schematically shown to simplify the drawings.

Figure 1:
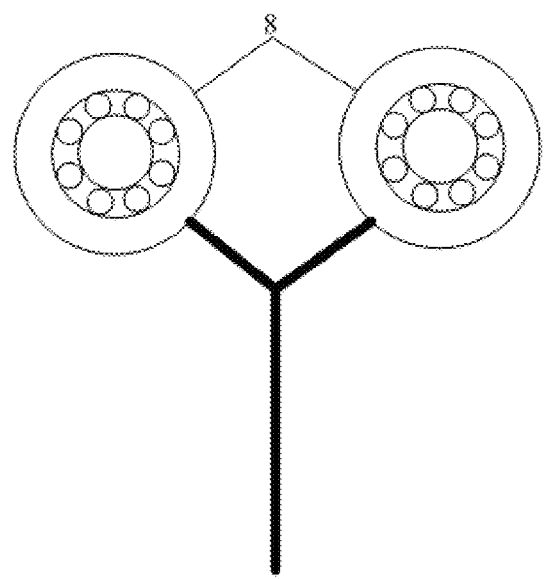
FIG. 1 is a schematic view of structure of a guide roller in the prior art.
Figure 2:
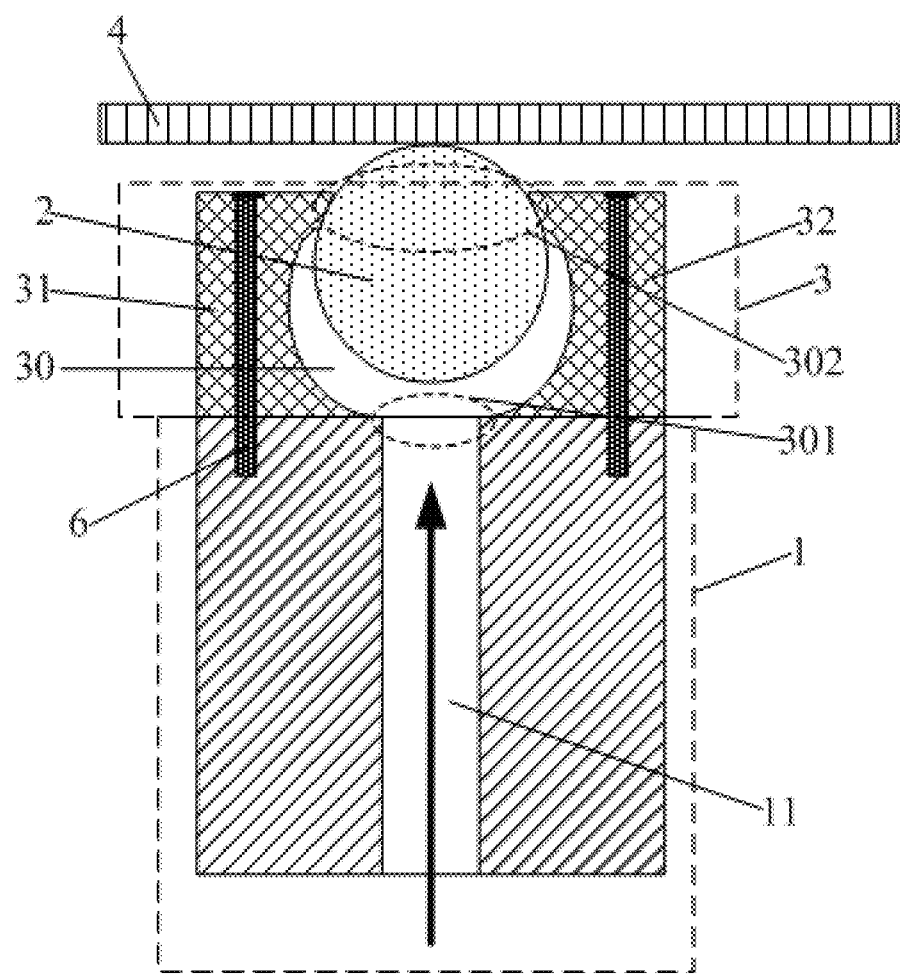
FIG. 2 is a schematic cross-sectional view of a supporting and transferring mechanism according to an exemplary embodiment of the present disclosure.
Figure 3:
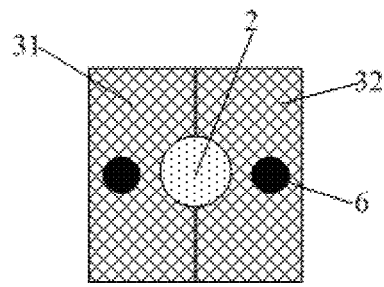
FIG. 3 is a schematic top view of the supporting and transferring mechanism in FIG. 2.

FIG. 2 is a schematic cross-sectional view of a supporting and transferring mechanism according to an exemplary embodiment of the present disclosure; and FIG. 3 is a schematic top view of the supporting and transferring mechanism in FIG. 2.

According to an exemplary embodiment of the present disclosure, there is provided a supporting and transferring mechanism for a plate-like article, such as a glass substrate in a TFT-LCD (Thin Film Transistor Liquid Crystal Display), as shown in FIG. 2 and FIG. 3, including: a gas supply portion 1, a supporting ball 2 and an accommodating portion 3. An accommodating space 30 is formed in the accommodating portion 3 and the supporting ball 2 is provided in the accommodating space 30. The gas supply portion 1 is communicated with the accommodating portion 3 to supply a gas of preset pressure into the accommodating space 30, so as to lift the supporting ball 2 in the accommodating space 30 such that a part of its surface protrudes out of the accommodating portion 3. The part of the surface of the supporting ball 2 protruding out of the accommodating portion 3 may support the moving plate-like article 4 and the supporting ball 2 is rotated under the driving of the plate-like article so as to realize the transfer of the plate-like article.

In the supporting and transferring mechanism according to the embodiment of the present disclosure, a point-contact support to the plate-like article 4 is achieved by means of the supporting ball 2 so that the wear suffered by the supporting ball 2 in the process of supporting and transferring the plate-like article 4 is greatly reduced. In the meantime, since the supporting ball 2 is flexibly rotated under the action of gas pressure and the driving from the plate-like article, the transfer of the plate-like article 4 is realized. The wear suffered by the supporting ball 2 itself during the supporting and transferring process may be further reduced by means of gas pressure support of the gas supply portion 1 to the supporting ball 2, prolonging the service life of the supporting and transferring mechanism. In addition, the height of the part of the supporting ball 2 protruding out of the accommodating portion 3 during the long-time supporting and transferring process remains constant due to the support of the gas of preset pressure provided by the gas supply portion 1 to the supporting ball 2, so that the relative position between the gas blowing member, which is provided on the periphery of the supporting and transferring mechanism to dry the plate-like article 4, and the plate-like article 4 remains unchanged, and thus the plate-like article 4 can be uniformly dried.

In an embodiment of the present disclosure, the gas blowing member is provided with elongated gas outlets extending in a direction perpendicular to the moving direction of the plate-like article 4, so that a "gas knife" is formed on the surface of the plate-like article to implement a drying treatment to the surface of the plate-like article.

In an exemplary embodiment, the accommodating portion 3 includes a first member 31 and a second member 32 that are opposite to each other. The first member 31 and the second member 32 are assembled together to form the accommodating space 30. In this way, the first member 31 and the second member 32 can be easily detached to replace the supporting ball 2 in the accommodating space 30. The gas supply portion 1 includes a gas supply passage 11 and a gas source (referring to the reference numeral 12 in FIG. 8) communicated with the gas supply passage 11. The gas source is provided at an inlet of the gas supply passage 11 for supplying the gas of preset pressure into the gas supply passage 11. In another embodiment, the gas source may be communicated with the gas supply passage 11 via a gas supply pipe. The accommodating space 30 includes a first opening 301. The first opening 301 is communicated with an outlet of the gas supply passage 11. The gas supplied by the gas source enters the accommodating space 30 through the first opening 301. The accommodating space 30 further includes a second opening 302 opposite to the first opening 301. The part of the surface of the supporting ball 2 protrudes out of the accommodating portion 3 through the second opening 302 so as to support the plate-like article 4.

In an embodiment, the volume of the accommodating space 30 is greater than the volume of the supporting ball 2. In this way, the gas may be used as a supporting medium after the supporting ball 2 is lifted by the gas pressure, so that the supporting ball 2 may be rotated in any direction in the gas-filled space. Further, in a case that the plate-like article 4 is transferred, the friction force suffered by the supporting ball 2 during the supporting and transferring process is also greatly reduced. As a result, the wear of the supporting ball is greatly reduced and the service life thereof is prolonged. In addition, the gas source usually adopts a gas pump capable of supplying a gas of preset pressure.

It should be noted that the gas supplied by the gas supply portion 1 may be any gas as long as the supporting ball 2 is lifted by the preset gas pressure.

In an embodiment, portions of both the first member 31 and the second member 32 that are located at the second opening 302 are fitted with the surface of the supporting ball 2 lifted by the gas. In this way, the supporting ball 2 can be brought into close contact with both the first member 31 and the second member 32 at the second opening 302 under the action of the gas pressure, so as to prevent the gas in the accommodating space 30 from leaking, ensuring that the gas pressure in the accommodating space 30 is always kept stable. As a result, the height of the part of the supporting ball 2 protruding out of the accommodating portion 3 is kept constant during the long-time supporting and transferring process, thereby ensuring the stability and the accuracy in the whole process of supporting and transferring the plate-like article 4.

Figure 4:
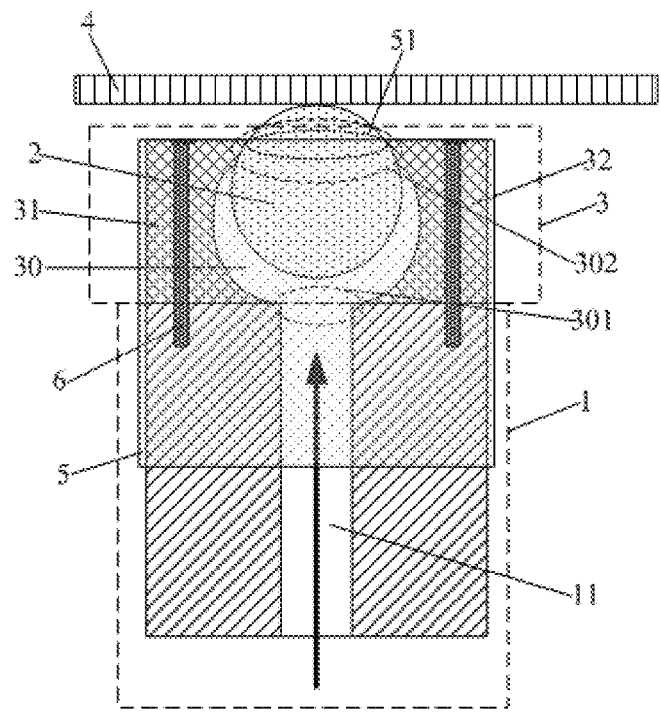
FIG. 4 is a schematic cross-sectional view of a supporting and transferring mechanism according to another embodiment of the present disclosure.

FIG. 4 is a schematic cross-sectional view of a supporting and transferring mechanism according to another embodiment of the present disclosure. In one embodiment, as shown in FIG. 4, the supporting and transferring mechanism further includes a sealing sleeve 5 including a third opening 51 that is the same as the second opening 302 in size and shape. The sealing sleeve 5 can sleeve the accommodating portion 3 and the gas supply portion 1 therein and align the third opening 51 with the second opening 302, so as to prevent the gas from leaking out of the accommodating space 30. The gas supply portion 1 and the accommodating space 30 of the accommodating portion 3 can be entirely sealed by means of the sealing sleeve 5, so as to prevent the gas from leaking out of the gas supply portion 1 or the accommodating space 30. As a result, the gas pressure in the accommodating space 30 is always kept stable so that the height of the part of the supporting ball 2 protruding out of the accommodating portion 3 is kept constant during the long-time supporting and transferring process, thereby ensuring the stability and the accuracy in the whole process of supporting and transferring.

In the embodiment, the supporting ball 2 is made of glass or plastic. The supporting ball 2 made of this material has a smooth surface and hardness sufficient to support the plate-like article 4 so as to support and transfer the plate-like article 4. Also, there is less friction between the supporting ball 2 and the plate-like article 4, thereby reducing the wear of both the supporting ball 2 and the plate-like article 4 during the supporting and transferring process.

In an embodiment, the first member 31 and the second member 32 are connected to side walls of the gas supply passage 11 through detachable connectors 6. With the arrangement of the detachable connector 6, the first member 31 and the second member 32 are easily disassembled so as to facilitate replacing the supporting ball 2. Furthermore, a stable connection between the accommodating portion 3 and the gas supply portion 1 may be ensured so as to ensure the stability of the supporting ball 2 in the whole process of supporting and transferring, further making the supporting and transferring mechanism more stable during the supporting and the transferring process.

In an exemplary embodiment, the detachable connectors 6 may adopt connectors such as screws.

Figure 5:
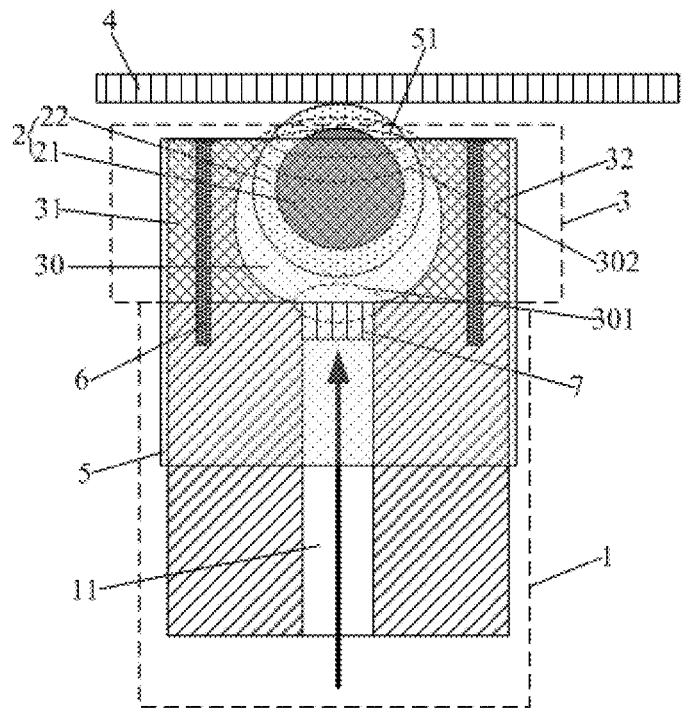
FIG. 5 is a schematic cross-sectional view of a supporting and transferring mechanism according to a further embodiment of the present disclosure.

FIG. 5 is a schematic cross-sectional view of a supporting and transferring mechanism according to a further embodiment of the present disclosure. According to the further embodiment of the present disclosure, there is provided a supporting and transferring mechanism different from the supporting and transferring mechanism according to the embodiment shown in FIG. 4. As shown in FIG. 5, on the basis of the supporting and transferring mechanism of the embodiment shown in FIG. 4, the supporting and transferring mechanism in this embodiment further includes a magnetic component 7 at the outlet of the gas supply passage. In this embodiment, the supporting ball 2 includes a magnet ball 21 which has the same polarity as the magnetic component 7. A repulsive force of preset magnitude may be generated between the magnet ball 21 and the magnetic member 7.

In the supporting and transferring mechanism in this embodiment, with an arrangement of the magnetic component 7, the supporting ball 2 is subjected to the gas pressure in the accommodating space 30 as well as the magnetic repulsive force exerted by the magnetic component 7, so that the supporting ball 2 is lifted by both the gas pressure and the magnetic repulsion force so as to support the plate-like article 4. In this way, the supporting ball 2 supports the plate-like article 4 more stably, further improving the stability and the reliability of the supporting and transferring mechanism during the supporting and transferring process.

Figure 6:
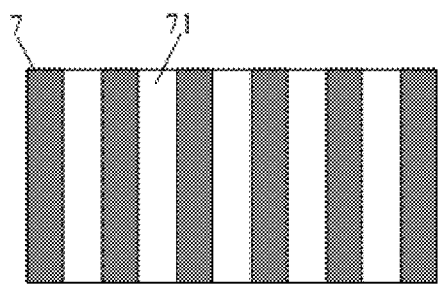
FIG. 6 is a schematic cross-sectional view of the magnetic member in FIG. 5.
Figure 7:
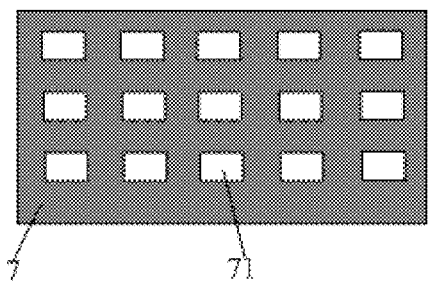
FIG. 7 is a schematic top view of the magnetic member in FIG. 5.

In an embodiment, as shown in FIG. 6 and FIG. 7, the magnetic member 7 is matched with the outlet of the gas supply passage in size and shape. The magnetic component 7 is provided with a plurality of through holes 71 therein in a direction of gas entering through the first opening 301, the plurality of through holes 71 being uniformly distributed in the magnetic member 7. In this way, the magnetic member 7 at the outlet of the gas supply passage will not block the gas supply portion 1 from supplying gas into the accommodating space 30. The through holes 71 uniformly distributed in the magnetic member 7 may facilitate supplying uniformly the gas from the gas supply portion 1 into the accommodating space 30 so as to ensure the uniform pressure of the gas in the accommodating space 30 acting onto the supporting ball 2, further ensuring a stable support of the supporting ball 2 to the plate-like article 4.

In one embodiment, as shown in FIG. 5, the supporting ball 2 further includes a ball shell 22 having hardness less than that of the magnet ball 21. The ball shell 22 encapsulates the magnet ball 21, and the magnet ball 21 is configured such that magnetic lines from the magnet ball pass through the ball shell 22 to generate a preset repulsive force between the magnet ball 21 and the magnetic member 7. The ball shell 22 is made of plastic or glass. The magnet ball 21 is usually made of metallic material which may damage the plate-like article 4 during the supporting and the transferring process. The magnet ball 21 is encapsulated by the ball shell 22 made of plastic or glass and the hardness of the ball shell 22 is less than that of the magnet ball 21. In this way, damage to the plate-like article 4 is avoided. In addition, since the surface of the ball shell 22 made of plastic or glass is relatively smooth, the friction between the supporting ball 2 and the plate-like article 4 may be reduced so that the supporting ball 2 and the plate-like article 4 are not easily worn.

The other structures of the supporting and transferring mechanism in the embodiment shown in FIG. 5 are the same as the corresponding structures of the supporting and transferring mechanism in the embodiment shown in FIG. 4, which will not be described herein again.

Figure 8:
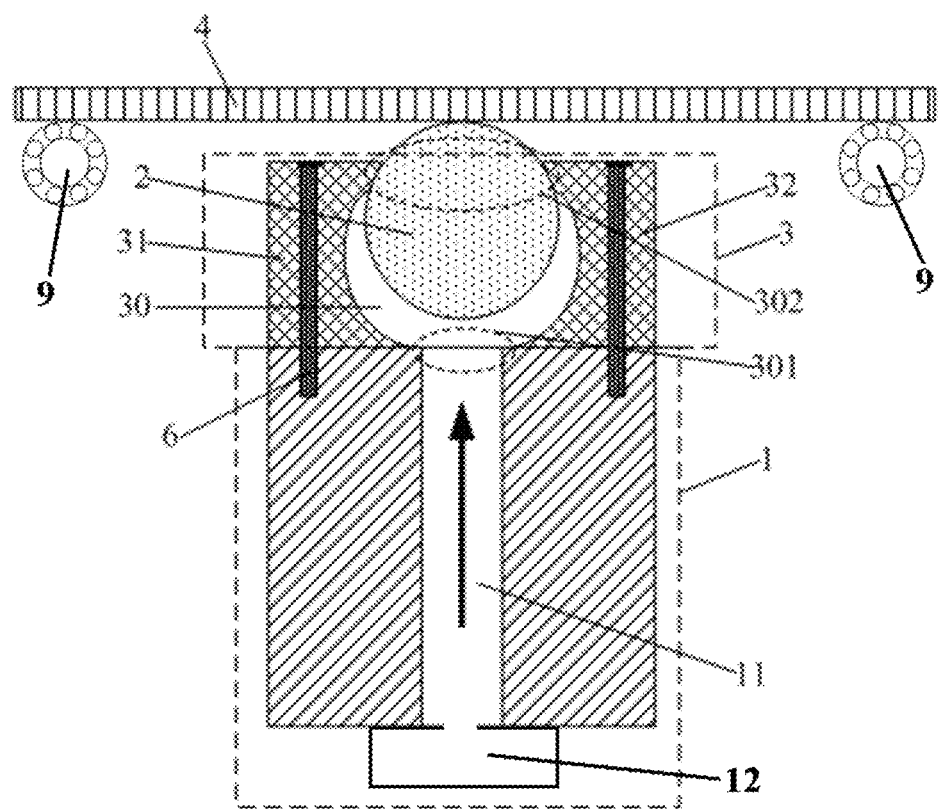
FIG. 8 is a schematic cross-sectional view of a supporting and transferring device according to an exemplary embodiment of the present disclosure.

With the supporting and transferring mechanism according to the above-described embodiments of the present disclosure, the point-contact support to the plate-like article can be realized by means of the supporting ball so that the wear of the supporting ball suffered in the process of supporting and transferring the plate-like article is greatly reduced. Meanwhile, since the supporting ball can flexibly rotate under the action of gas pressure, the transfer of the plate-like article is realized. The wear suffered by the supporting ball itself during the supporting and transferring process can be further reduced by means of gas pressure support of the gas supply portion to the supporting ball, prolonging the service life of the supporting and transferring mechanism. In addition, the height of the part of the supporting ball protruding out of the accommodating portion during the long-time supporting and transferring process remains constant due to the support of the gas of preset pressure provided by the gas supply portion to the supporting ball, so that the relative position between the gas knife member, which is provided at the periphery of the supporting and transferring mechanism to dry the plate-like article, and the plate-like article remains unchanged and so that the plate-like article can be uniformly dried. FIG. 8 is a schematic cross-sectional view of a supporting and transferring device according to an exemplary embodiment of the present disclosure. According to still another exemplary embodiment of the present disclosure, there is provided a supporting and transferring device including: at least one driving wheel 9 configured to drive a plate-like article to move; and at least one supporting and transferring mechanism as described in any one of the above embodiments, which is configured to cooperate with the driving wheel to support and transfer the plate-like article.

As shown in FIG. 8, a supporting and transferring mechanism is provided between two driving wheels 9. It can be understood that a plurality of supporting and transferring mechanisms may be provided between the two driving wheels 9. In this way, the supporting and transferring mechanisms cooperate with the driving wheels to uniformly support the plate-like article 4. Each supporting and transferring mechanism includes a gas supply portion 1, a supporting ball 2 and an accommodating portion 3. An accommodating space 30 is formed in the accommodating portion 3 and the supporting ball 2 is provided in the accommodating space 30. The gas supply portion 1 is communicated with the accommodating portion 3 to supply gas of preset pressure into the accommodating space 30, so as to lift the supporting ball 2 in the accommodating space 30 such that a part of its surface protrudes out of the accommodating portion 3. The part of the surface of the supporting ball 2 protruding out of the accommodating portion 3 can support the moving plate-like article 4. In this way, the plate-like article 4 moves under the driving of the driving wheels 9, so that the supporting ball 2 rotates under the driving of the plate-like article so as to transfer the plate-like article.

The gas supply portion 1 includes a gas supply passage 11 and a gas source 12 communicated with the gas supply passage 11. The gas source 12 is disposed at an inlet of the gas supply passage 11 for supplying gas of preset pressure to the gas supply passage 11. In another embodiment, the gas source may be communicated with the gas supply passage 11 via a gas supply pipe.

By using the supporting and transferring mechanism according to any of the above embodiments, the wear of the internal components in the supporting and transferring device is reduced, the service life thereof is prolonged, and the stability and the reliability of the supporting and transferring device in supporting and transferring are also improved.

It should be understood that the above embodiments are merely exemplary embodiments used for illustrating the principle of the embodiments of the present disclosure, and the embodiments of the present disclosure are not limited thereto. It will be apparent to those skilled in the art that various modifications and improvements can be made without departing from the spirit and scope of the embodiments of the present disclosure and are to be considered to be within the protection scope of the embodiments of the present disclosure.

What is claimed is:

1. A supporting and transferring mechanism for a plate-like article, comprising:
   a gas supply portion;
   an accommodating portion in which an accommodating space is formed;
   a supporting ball in the accommodating space; and
   a sealing sleeve,
   wherein the gas supply portion is communicated with the accommodating portion and configured to supply a gas of preset pressure into the accommodating space, so as to lift the supporting ball in the accommodating space such that a part of a surface of the supporting ball protrudes out of the accommodating portion, and
   wherein the part of the surface of the supporting ball protruding out of the accommodating portion supports the plate-like article so as to transfer the plate-like article,
   wherein the gas supply portion comprises a gas supply passage configured to supply the gas of preset pressure into the accommodating space, and
   wherein the accommodating space comprises a first opening which is communicated with an outlet of the gas supply passage and a second opening opposite to the first opening, and the gas supplied by the gas supply passage enters the accommodating space through the first opening, and the part of the surface of the supporting ball protrudes out of the accommodating portion through the second opening, and
   wherein the sealing sleeve comprises a third opening that is the same as the second opening in size and shape and is configured to sleeve the accommodating portion and the gas supply portion therein and to align the third opening with the second opening, so as to prevent the gas from leaking out of the accommodating space.

2. The supporting and transferring mechanism according to claim 1, wherein the accommodating portion comprises a first member and a second member that are opposite to each other, and the first member and the second member are assembled together to form the accommodating space.

3. The supporting and transferring mechanism according to claim 2, wherein portions of both the first member and the second member that are located at the second opening are fitted with the surface of the supporting ball lifted by the gas.

4. The supporting and transferring mechanism according to claim 1, wherein the supporting ball is made of glass or plastic.

5. The supporting and transferring mechanism according to claim 2, wherein the first member and the second member are connected to the gas supply portion through a detachable connector.

6. A supporting and transferring device for driving a plate-like article, comprising:
   at least one driving wheel configured to drive the plate-like article to move; and
   at least one supporting and transferring mechanism according to claim 1, configured to cooperate with the driving wheel so as to support and transfer the plate-like article.

7. The supporting and transferring device according to claim 6, wherein the accommodating portion comprises a first member and a second member that are opposite to each other, and the first member and the second member are assembled together to form the accommodating space.

8. The supporting and transferring device according to claim 7, wherein
portions of both the first member and the second member that are located at the second opening are fitted with the surface of the supporting ball lifted by the gas.

9. A supporting and transferring mechanism for a plate-like article, comprising:
a gas supply portion;
an accommodating portion in which an accommodating space is formed; and
a supporting ball in the accommodating space,
wherein the gas supply portion is communicated with the accommodating portion and configured to supply a gas of preset pressure into the accommodating space, so as to lift the supporting ball in the accommodating space such that a part of a surface of the supporting ball protrudes out of the accommodating portion, and
wherein the part of the surface of the supporting ball protruding out of the accommodating portion supports the plate-like article so as to transfer the plate-like article,
wherein the gas supply portion comprises a gas supply passage configured to supply the gas of preset pressure into the accommodating space, and
wherein the accommodating space comprises a first opening which is communicated with an outlet of the gas supply passage, and the gas supplied by the gas supply passage enters the accommodating space through the first opening, and
wherein the supporting and transferring mechanism, further comprises a magnetic member at the outlet of the gas supply passage;
wherein the supporting ball comprises a magnet ball which has the same polarity as the magnetic member so as to generate a repulsive force between the magnet ball and the magnetic member.

10. The supporting and transferring mechanism according to claim 9, wherein the magnetic member is matched with the outlet of the gas supply passage in size and shape, and the magnetic member is provided with a plurality of through holes therein in a direction of gas entering through the first opening, the plurality of through holes being uniformly distributed in the magnetic member.

11. The supporting and transferring mechanism according to claim 9, wherein the supporting ball further comprises a ball shell encapsulating the magnet ball, hardness of the ball shell being lower than hardness of the magnet ball; and
wherein the magnet ball is configured such that magnetic lines from the magnet ball pass through the ball shell.

12. The supporting and transferring mechanism according to claim 11, wherein the ball shell is made of plastic or glass.

13. A supporting and transferring device for driving a plate-like article, comprising:
at least one driving wheel configured to drive the plate-like article to move; and
at least one supporting and transferring mechanism according to claim 9, configured to cooperate with the driving wheel so as to support and transfer the plate-like article.

14. The supporting and transferring device according to claim 13, wherein the magnetic member is matched with the outlet of the gas supply passage in size and shape, and the magnetic member is provided with a plurality of through holes therein in a direction of gas entering through the first opening, the plurality of through holes being uniformly distributed in the magnetic member.

15. The supporting and transferring device according to claim 13, wherein the supporting ball further comprises a ball shell encapsulating the magnet ball, hardness of the ball shell being lower than hardness of the magnet ball; and
wherein the magnet ball is configured such that magnetic lines from the magnet ball pass through the ball shell.

* * * * *